US011340597B2

(12) United States Patent
Zeng et al.

(10) Patent No.: US 11,340,597 B2
(45) Date of Patent: May 24, 2022

(54) 3-D PRINTING BATCH ANALYSIS

(71) Applicant: Hewlett-Packard Development Company, L.P., Spring, TX (US)

(72) Inventors: Jun Zeng, Palo Alto, CA (US); Juan Carlos Catana, Guadalajara (MX); Sam A. Stodder, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 28 days.

(21) Appl. No.: 16/978,227

(22) PCT Filed: Apr. 27, 2018

(86) PCT No.: PCT/US2018/029842
§ 371 (c)(1),
(2) Date: Sep. 4, 2020

(87) PCT Pub. No.: WO2019/209318
PCT Pub. Date: Oct. 31, 2019

(65) Prior Publication Data
US 2021/0365017 A1 Nov. 25, 2021

(51) Int. Cl.
*G05B 19/418* (2006.01)
*B33Y 50/00* (2015.01)
*B29C 64/386* (2017.01)
*G06Q 10/06* (2012.01)

(52) U.S. Cl.
CPC ...... *G05B 19/41875* (2013.01); *B29C 64/386* (2017.08); *B33Y 50/00* (2014.12); *G06Q 10/0635* (2013.01); *G05B 2219/31461* (2013.01); *G05B 2219/32077* (2013.01)

(58) Field of Classification Search
CPC .... G05B 19/41875; G05B 2219/31461; G05B 2219/32077; B33Y 50/00; B29C 64/386
See application file for complete search history.

(56) References Cited

U.S. PATENT DOCUMENTS

| | | | |
|---|---|---|---|
| 9,180,624 B2 | 11/2015 | Fisker et al. | |
| 9,561,622 B2 | 2/2017 | Das et al. | |
| 2016/0086353 A1* | 3/2016 | Lukac | G06T 9/00 345/419 |
| 2016/0250810 A1 | 9/2016 | Lynch August et al. | |
| 2016/0361878 A1 | 12/2016 | Gain et al. | |
| 2017/0120335 A1 | 5/2017 | DeMuth et al. | |

(Continued)

FOREIGN PATENT DOCUMENTS

| | | | | |
|---|---|---|---|---|
| WO | WO-2016033045 A1 | 3/2016 | | |
| WO | WO-2020215093 A1 * | 10/2020 | ............. | B33Y 10/00 |

*Primary Examiner* — Ronald D Hartman, Jr.
(74) *Attorney, Agent, or Firm* — Hanley Flight & Zimmerman LLC

(57) ABSTRACT

3-D printing batch analysis is disclosed. A disclosed example apparatus includes a processor to generate a plurality of batches, wherein each of the batches represent an arrangement of a plurality of parts to be printed in a volume, discretize the batches into slices, and determine risk values of the slices based on the respective geometric primitives. The processor is to also determine aggregate risk values corresponding to the batches based on the risk values of the slices of the respective batches, and select a batch of the plurality of batches based on the aggregate risk values. The example apparatus also includes a printer to print the selected batch in the volume.

20 Claims, 12 Drawing Sheets

(56) References Cited

U.S. PATENT DOCUMENTS

| | | |
|---|---|---|
| 2017/0232515 A1 | 8/2017 | DeMuth et al. |
| 2018/0004871 A1 | 1/2018 | Griffith et al. |
| 2018/0024517 A1 | 1/2018 | Halperin |
| 2018/0104912 A1* | 4/2018 | Bastian .................... H04N 1/00 |
| 2021/0276270 A1* | 9/2021 | Luan ...................... B33Y 10/00 |

* cited by examiner

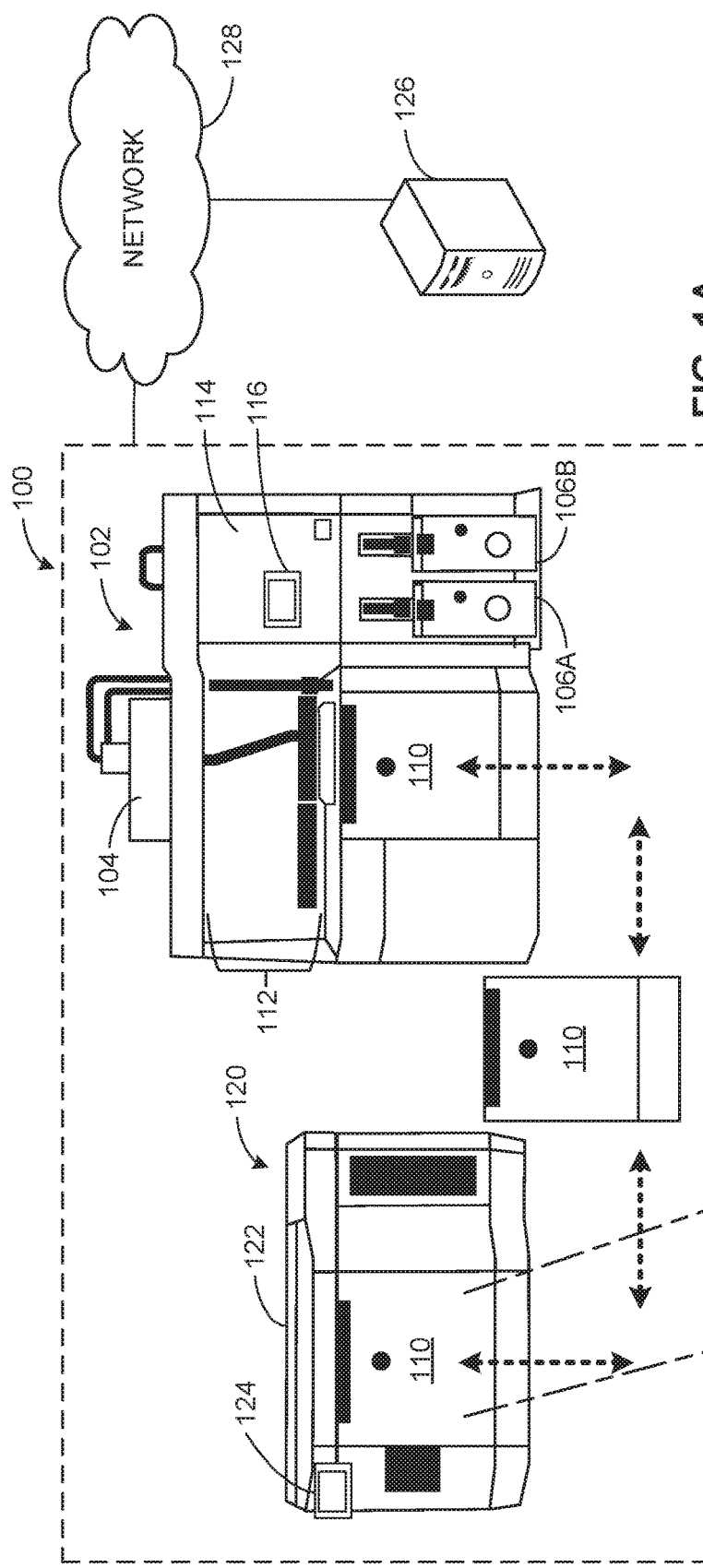
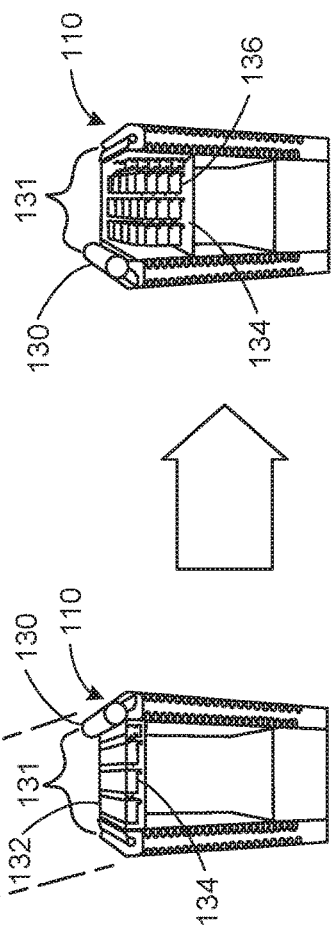
FIG. 1A
FIG. 1B
FIG. 1C

3-D PRINTING BATCH ANALYSIS

BACKGROUND

Typically, 3-D printing in a manufacturing environment involves printing numerous parts in a defined build volume. In particular, the parts, which can be different or identical to one another, are printed by depositing material in multiple layers. Sometimes numerous parts are arranged together as a batch to be printed in the build volume. The relative arrangement and positioning of these parts in a volume can affect part quality and/or manufacturability of the parts.

BRIEF DESCRIPTION OF THE DRAWINGS

FIG. TA illustrates an example 3-D printing system in which the examples disclosed herein may be implemented.

FIGS. 1B and 1C depict an example build unit of an example printer of the 3-D printing system of FIG. TA in two stages of 3-D printing.

The figures are not to scale. Instead, the thickness of the layers or regions may be enlarged in the drawings. Also, in general, the same reference numbers will be used throughout the drawing(s) and accompanying written description to refer to the same or like parts.

DETAILED DESCRIPTION

Figure 2:
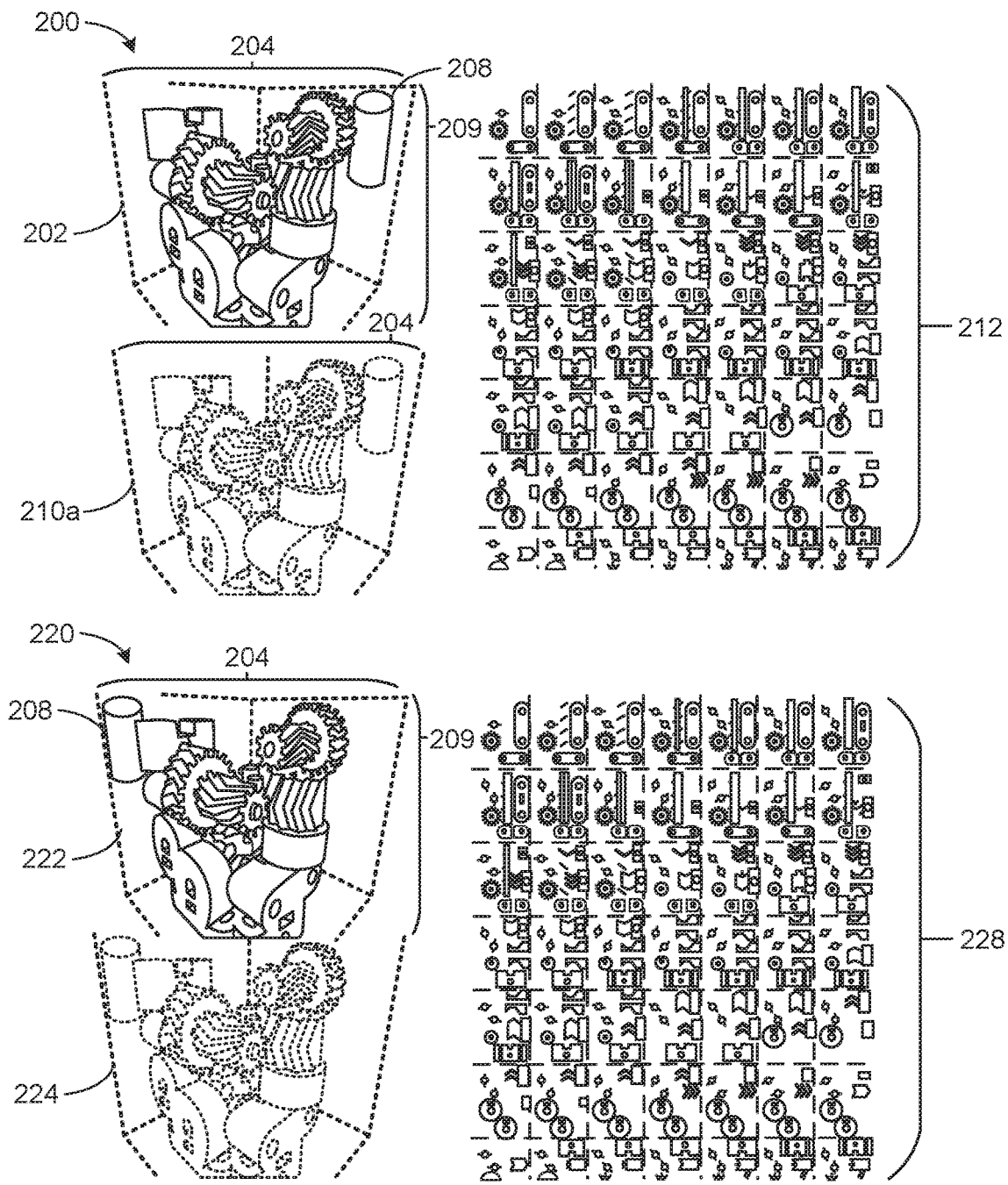
FIG. 2 illustrates example batches that can be generated and/or analyzed in examples disclosed herein.

3-D printing batch analysis is disclosed. Known 3-D printers are sometimes used to produce multiple parts in a single volume. The parts are printed as a batch, which includes a physical arrangement of the parts in a volume. More specifically, relative positioning and orientation of the parts within the volume define the batch. Accordingly, different batches can have different arrangements of the same parts within the volume. These different relative arrangements of the parts can impact part manufacturability, cooling, tolerances and/or quality.

Examples disclosed herein enable computationally efficient analysis of batches to improve part building parameters and/or part quality (e.g., more accurate parts, parts less susceptible to aesthetic or structural imperfections, etc.). Examples disclosed herein generate a plurality of batches and discretize the batches into slices. According to examples disclosed herein, the slices are reduced into geometric primitives, which can be defined based on descriptors (e.g., simplified geometric elements), and assessed for respective risk values. In turn, the risk values are used to calculate aggregate risk values of the corresponding batches. In some examples, the risk values indicate an extent of a risk associated with part production, part quality, and/or part processing robustness (e.g., the cooling of parts, reducing re-reflection during application of energy, controlling part density within a volume, etc.). Accordingly, the examples disclosed herein can be adapted to analyze any pre-defined printing parameter or multiple printing parameters together, thereby enabling effective and accurate determination of risks involved in printing a batch.

In some examples, a batch of the plurality of batches having the lowest aggregate risk value is selected for printing production. In some examples, the geometric primitives used to calculate risk values for slices are based on Voronoi representations and/or geometric descriptors (e.g., an array of multiple circles having different radii). In some such examples, the Voronoi representations include Voronoi cells. Some examples disclosed herein incorporate an evolutionary process associated with the batches so that a batch can be reiteratively modified such that a batch that has been evolved to have a relatively low aggregate risk value (e.g., the lowest aggregate risk value) is selected for printing production.

As used herein, the term "printer" can refer to any structure, apparatus, component, subcomponent, subsystem and/or system that is utilized in printing 3-D structures. As used herein, the term "slice" refers to a 2-D slice or planar portion of a 3-D volume. As used herein, the term "batch" refers to a collection of parts that are positioned and/or oriented relative to one another for production in a defined production or build volume. Accordingly, the term "batch" can refer to a spatial arrangement of defined parts within the production volume.

FIG. 1A illustrates an example 3-D printing system 100 in which the examples disclosed herein may be implemented. The 3-D printing system 100 of the illustrated example includes a processing station 102 with a material dispenser (e.g., a material mixing dispenser) 104, material storage 106a, 106b, and a build unit 110. In this example, the processing station 102 also includes a processing area (e.g., a part processing area) 112, a recycling unit 114 and a display 116.

The example 3-D printing system 100 also includes a printer 120. According to the illustrated example, the printer 120 includes a part production portion 122 and a display 124. In this example, the printer 120 can receive the build unit 110 to produce parts. In other words, the build unit 110 is movable in this example between the processing station 102 and the printer 120.

In this example, a workstation 126 is communicatively coupled to the 3-D printing system 100 via a network (e.g., a wireless network, a wired network, etc.) 128. In some examples, the workstation 126 and/or functionality associated with the workstation 126 is operationally integrated with the processing station 102 and/or the printer 120. While an example network topology is shown in FIG. 1A, any appropriate network topology may be implemented.

To define part data (e.g., part generation or printing parameters) of parts to be built by the 3-D printing system 100, the workstation 126 processes 3-D part files associated with the parts (e.g., a voxel grid associated with the parts). In this example, the workstation 126 arranges the parts to be produced in a batch or multiple batches, from which a batch may be selected. In this example, the batch defines relative positions of each of the parts to one another so that the parts can be produced in a single volume (e.g., a build volume) of the build unit 110. In particular, the relative positions and orientations of the parts in the volume define the batch to be printed by the printer 120.

To produce 3-D printed components based on the part definition parameters and/or part data, the build unit 110 is placed into the printer 120 after the build unit 110 is provided with materials from the processing station 102. In particular, the example material dispenser 104 transfers material from the material storage 106a, 106b to the build unit 110 prior to the built unit 110 being transferred to the printer 120. In this example, the material dispenser 104 provides the appropriate material type and volume to the build unit 110 based on the part data (e.g., a defined part batch arrangement and/or part geometry files, etc.). In this example, a multi-jet fusion process is employed to print 3-D parts for production (e.g., parts based on voxels using multiple fusing agents).

While the example of FIG. 1A depicts a multi jet fusion process, any appropriate 3-D printing and/or lithography process can implement examples disclosed herein. In some examples, the processing station 102 and the printer 120 are integral. In some examples, the processing unit 102 is used for post-build processing (e.g., cleaning, cooling, smoothing, etc.) of the parts printed in the printer 120. For example, the processing unit 102 can be used for thermal, finish and/or mechanical processing of the parts printed by the printer 120.

FIGS. 1B and 1C depict example 3-D printing performed by the printer 120 of the 3-D printing system 100 of FIG. 1A. Turning to FIG. 1B, to produce parts in a build volume 131 of the build unit 110, a movable roller 130 is provided with material and moves across (e.g., left to right and vice-versa in the view of FIG. 1B) the build volume 131, thereby defining a material layer 132. In this example, a fusing agent (e.g., a liquid fusing agent) and a detailing agent (e.g., a liquid detailing agent) are applied to the material during the layering process. In some examples, energy (e.g., heat energy, light energy, etc.) is applied to the material to facilitate fusing and/or solidification at each layer. Accordingly, this process is repeated as a build platform 134 is lowered within the build volume 131.

FIG. 1C depicts the build volume 131 of the build unit 110 as more layers are produced. In the illustrated view of FIG. 1C, the build platform 134 has been lowered relative to the view shown in FIG. 1B as additional layers have been provided. Further, multiple rows of parts 136 are defined in the build volume 131.

FIG. 2 illustrates example batches that can be generated and/or analyzed in examples disclosed herein. According to the illustrated example of FIG. 2, a first batch 200 is shown in an isometric view 202 having corresponding parts 204, which include a component 208, in a volume 209. As can also be seen in the view of FIG. 2, the parts 204 are represented as wireframe objects in an isometric view 210. Further, the first batch 200 is shown represented as slices 212. In other words, the slices 212 are 2-D cross-sectional slice layers that represent 2-D cuts of the parts 204 within the volume 209, as defined by the batch 200.

FIG. 2 also shows a second batch 220, which is different from the first batch 200. The second batch 220 is represented in an isometric view 222 as well as a corresponding wireframe 224. In this example, the second batch 220 also includes the parts 204 (including the component 2008) in the volume 209. However, the component 208 is in a different position in the second batch 220 than in the first batch 200. In other words, the first batch and second batches 200, 220, respectively, represent different arrangements of the same parts 204 in the volume 209, thereby defining corresponding slices 228. These different arrangements can, accordingly, affect manufacturing parameters of the parts 204 including, but not limited to heat transfer, reflectivity, material gradients and/or material density.

Examples disclosed herein enable robust and computationally efficient selection and/or generation of favorable batches. Examples disclosed herein analyze multiple batches to select and/or generate a batch arrangement that can take into account one or more of the aforementioned manufacturing parameters, for example. Some examples disclosed herein evolve batches to generate a favorable batch for production.

Figure 3:
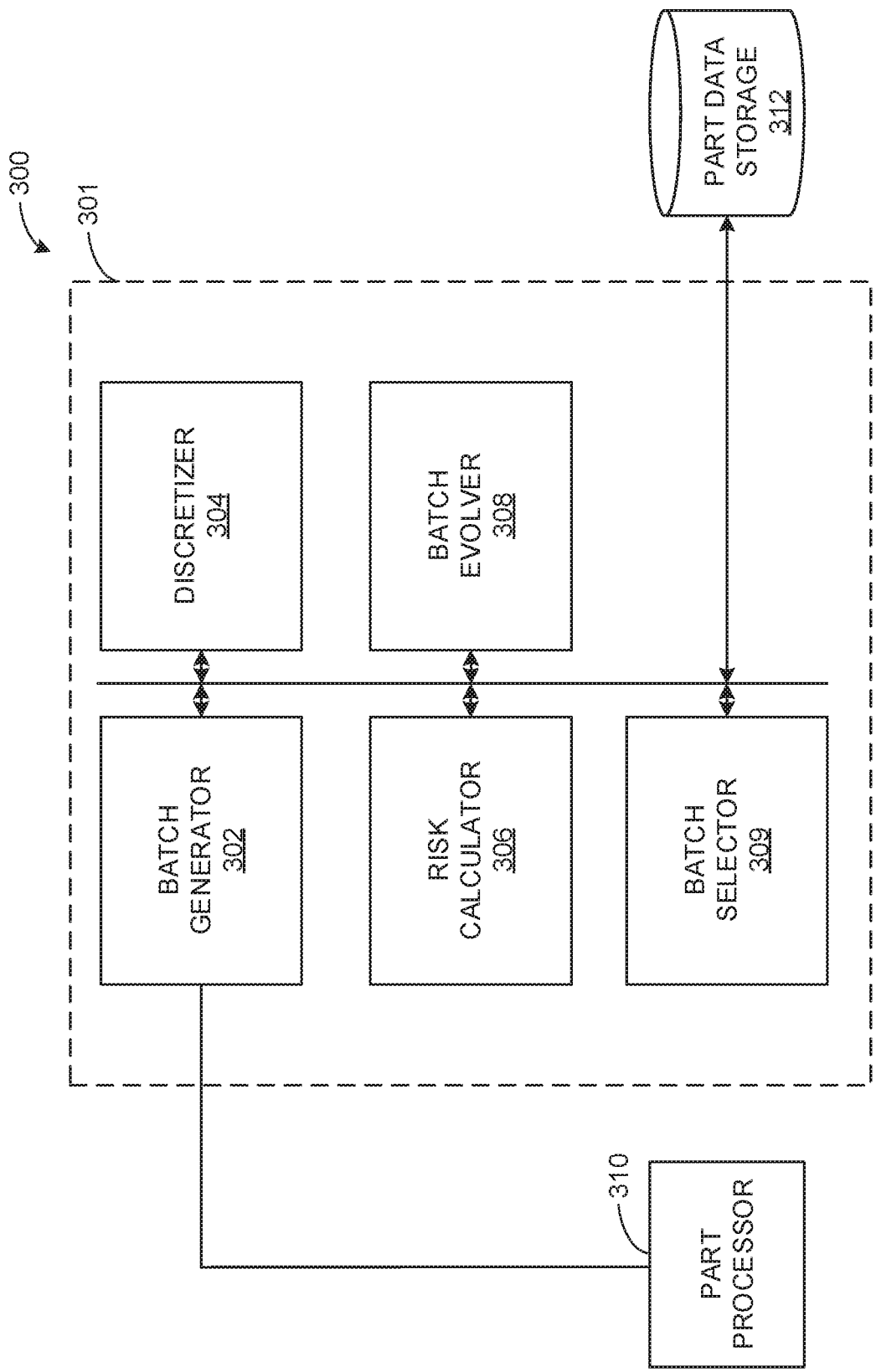
FIG. 3 is a schematic diagram of a batch analysis system in accordance with the teachings of this disclosure.

FIG. 3 is a schematic diagram of a batch analysis system 300 in accordance with the teachings of this disclosure. The example batch analysis system 300 can be implemented in the workstation 126, the processing station 102, the printer 120, and/or a remote computer of the network 128. The batch analysis system 300 of the illustrated example includes an analyzer 301, which includes a batch generator 302, a discretizer 304, a risk calculator 306, a batch evolver 308, and a batch selector 309. Further, the example batch analysis system 300 also includes a part processor 310, which is communicatively coupled to the batch generator 302, and a part data storage 312.

The part processor 310 of the illustrated example receives part data pertaining to the parts 204 and forwards the part data to the batch generator 302. The part data can include, but is not limited to, part geometry data, part tolerances, part quantities, and/or part tolerance requirements, etc. In some examples, the part processor 310 also forwards information associated with the volume 209 to the batch generator 302. Additionally or alternatively, the part processor 310 forwards build or printing parameters to the batch generator 302 (e.g., requested build time, requested part density in the volume 209, etc.).

To generate a plurality of batches, the example batch generator 302 utilizes the part data to define various arrangements of the parts 204 within the volume 209. In particular, the arrangements can include variations in positioning and/or orientations of the parts 204 relative to one another in the corresponding volume 209. In some examples, a first plurality of batches is generated randomly. In other examples, the first plurality of batches is generated based on rules (e.g., arranging similar parts in rows, etc.).

According to the illustrated example, the discretizer 304 discretizes (e.g., divides) the plurality of batches into planar slices (e.g., 2-D slices), such as the slices 212, 228 disclosed above in connection with FIG. 2. In some examples, the slices are defined uniformly across a length of the volume 209. However, in other examples, the slices may be defined with varying density and/or dimensions across the length of the volume 209 (e.g., based on volume metric material density and/or relative placements of the parts 204 within the volume 209).

To reduce the aforementioned slices corresponding to the batches into geometric primitives, the discretizer 304 of the illustrated example converts the slices into simplified representations. In some examples, the slices are converted into Voronoi representations and/or geometric descriptors.

Figure 4:
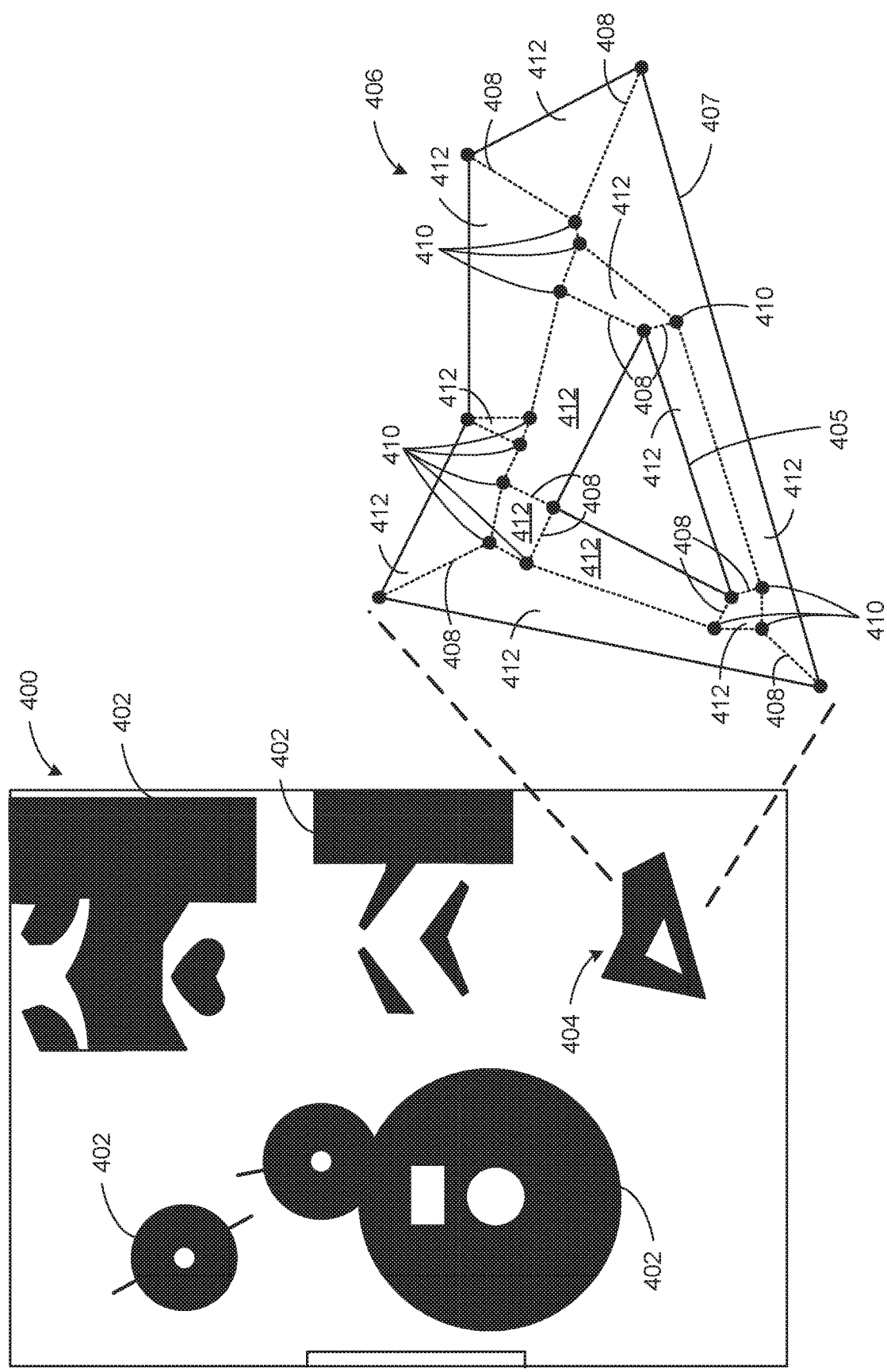
FIG. 4 illustrates an example batch slice having a portion represented as example geometric primitives that may be implemented in examples disclosed herein.

FIGS. 4-7 illustrate different examples of the discretizer 304 being implemented to discretize batches into slices and generate their respective geometric primitives and/or geometric descriptors. Turning to FIG. 4, an example batch slice 400 is shown represented as example geometric primitives. In the example of FIG. 4, numerous part islands 402, 404 are shown. In particular, the islands 402, 404 represent sections that will be solidified to define the parts 204. In this example, the island 404 is also shown represented as a geometric primitive 406, which is a Voronoi representation.

The geometric primitive 406 of the illustrated example includes inner and outer polygon edges 405, 407, respectively, Voronoi edges 408 and Voronoi vertices 410 that are defined by Voronoi cells 412 to represent the island 404. In this example, the Voronoi vertices 410 are each defined by at least three adjacent cells 412. Accordingly, each of the vertices 410 is a candidate to be a center of a respective representative circle that partially defines a shape of the island 404. In other words, multiple circles form descriptors of the geometric primitive 406. Accordingly, the radius of these candidate circles of the cells 412 is determined based on locations of cell nodes or tangential cell edges. In some examples, these representative candidate circles are pruned and/or re-shaped to reduce overlap therebetween. In some examples, the cells 412 can represent an internal hole or opening of the island 404.

As can be seen in FIG. 4, geometric primitives are defined by generating geometric attributes to represent content diversity of the islands 402, 404, thereby enabling representations that can be used for computationally efficient calculations, such as the risk calculations disclosed herein.

In some examples, the Voronoi representation and/or Voronoi diagram is expressed as follows:
Compute the Voronoi diagram of island
Select the Voronoi vertices inside island
For each Voronoi vertex, v_r
  For each cell c_v adjacent to v_r
    Get the distance from v_r to the object in c_v
  Get the minimum distance across the cells
Filter geometric primitives non overlapping at most d percentage.
Report filtered geometric primitives per island.

While the geometric primitive 406 in this example is based on a Voronoi representation, any other appropriate form of representation or mathematical formulation may be used instead to define the islands 402, 404. While the geometric primitive 406 is shown having the Voronoi vertices 410 define candidate circle locations, other geometries may be used instead including, but not limited to, squares, rectangles, triangles, pentagons, hexagons, irregular shapes, polynomials, etc.

Figure 5:
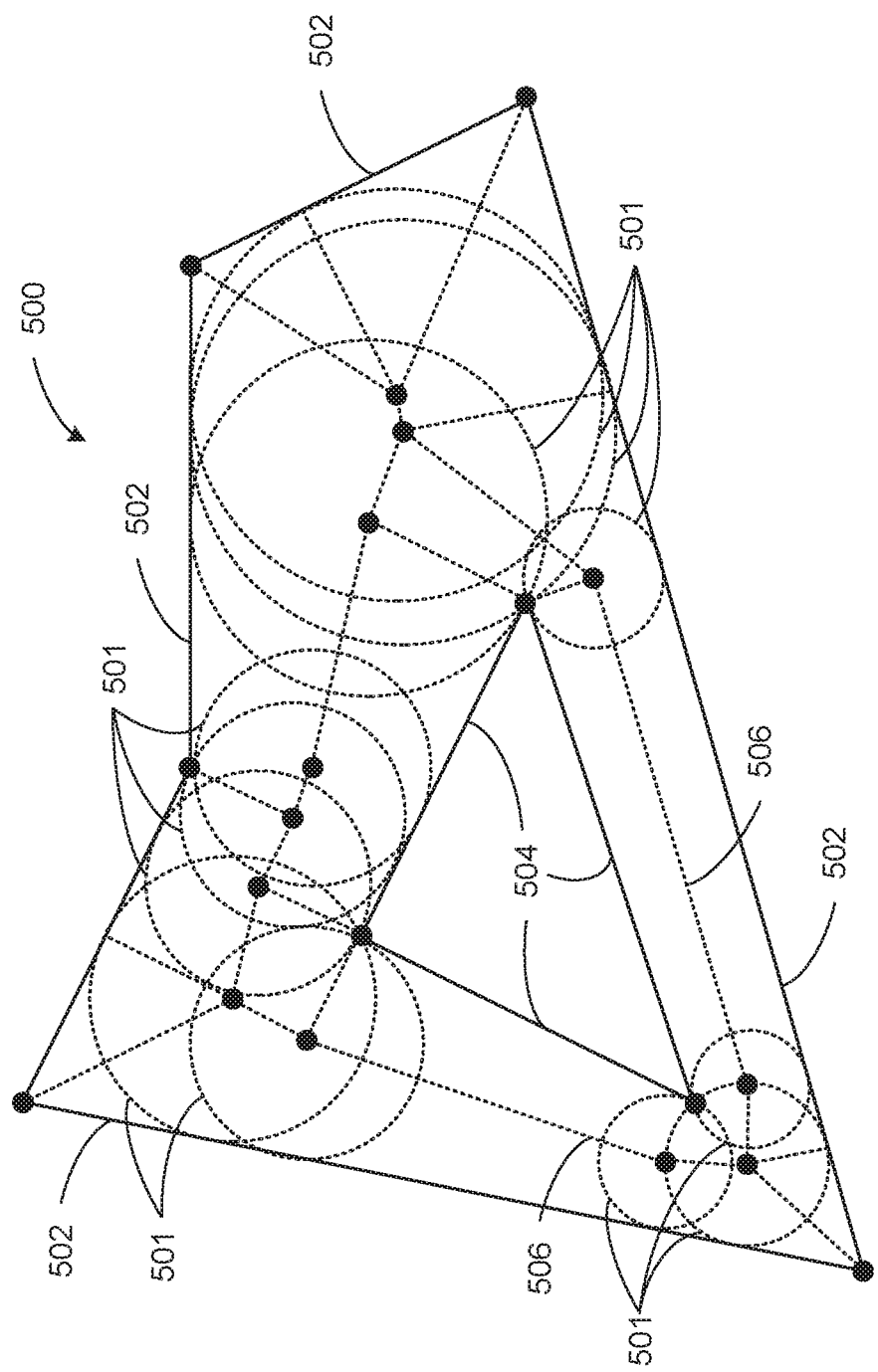
FIGS. 5-7 illustrate example descriptors that may be implemented in examples disclosed herein to define and/or score geometric primitives.
Figure 6:
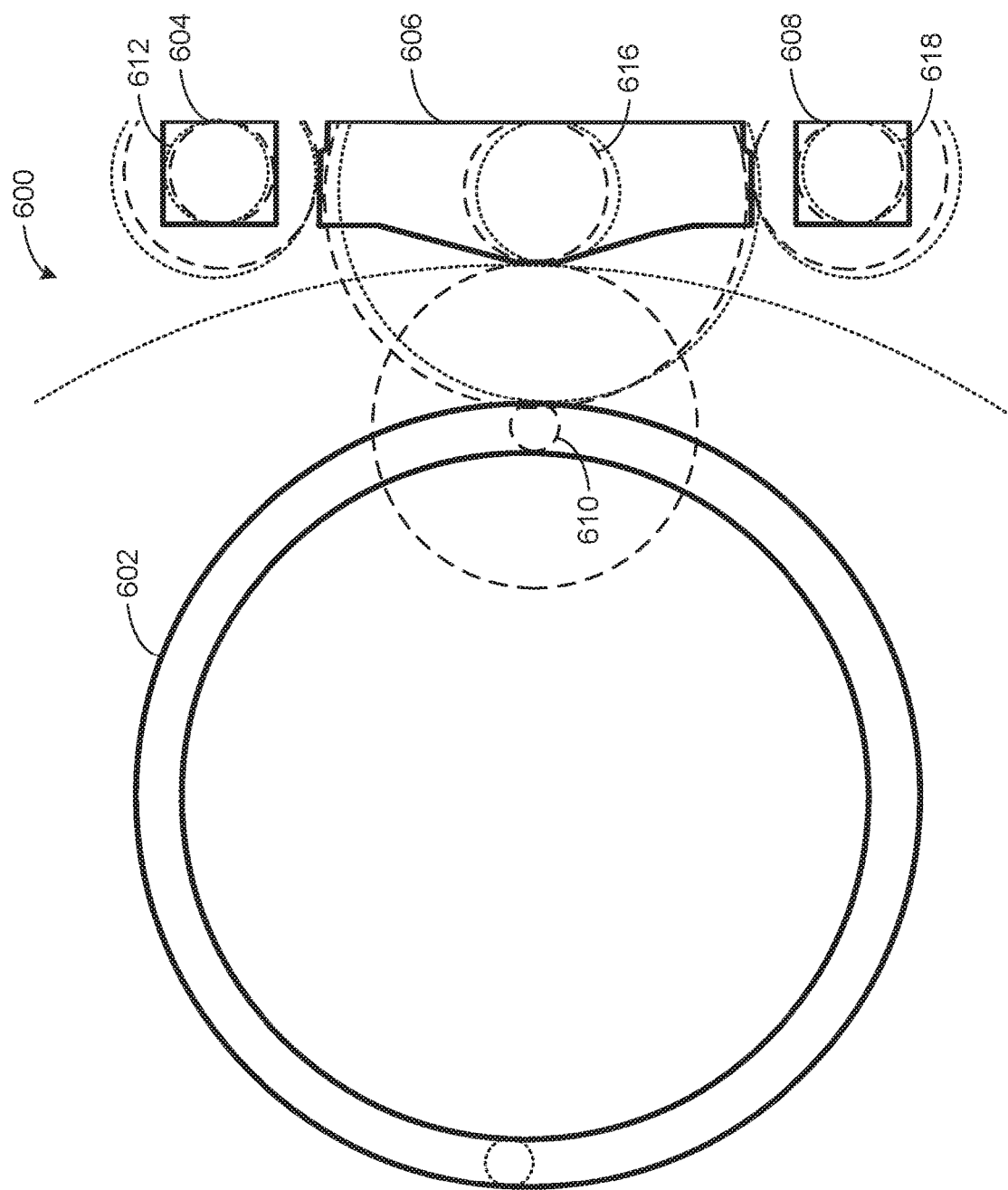
Figure 7:
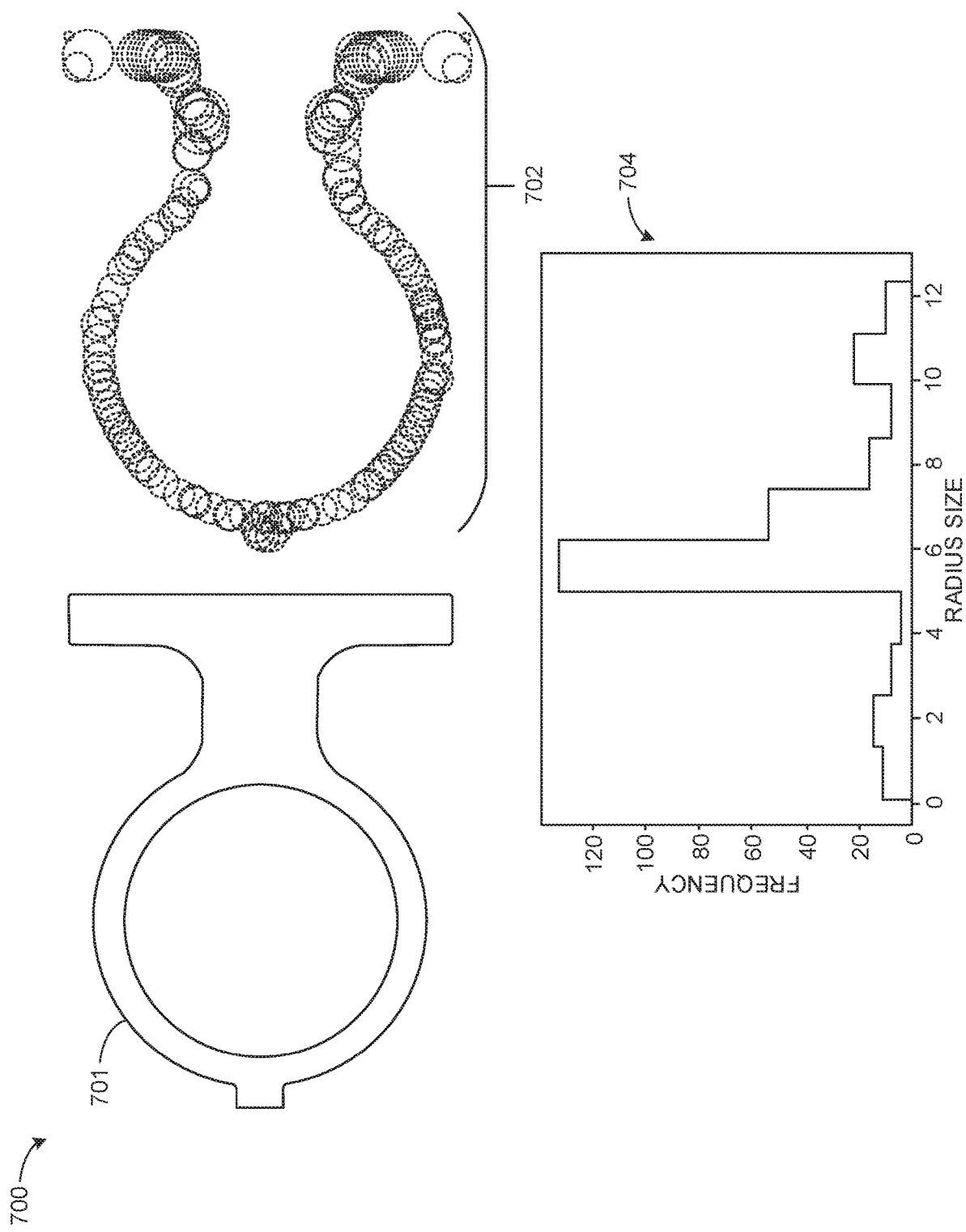

FIGS. 5-7 illustrates example descriptors 500, 600, 700, respectively, that may be implemented in examples disclosed herein to score and/or at least partially define geometric primitives (e.g., the geometric primitive 406). In particular, the example descriptors 500, 600, 700 can be implemented to process, define and/or transform circles defined on the Voronoi vertices shown in FIG. 4 so that a respective geometric primitive can be scored. Turning to FIG. 5, a definition scheme of the descriptor 500 can represent the candidate circles mentioned above in connection FIG. 4. According to the illustrated example, the descriptor 500 includes multiple circles 501 to represent a respective island. The example circles 501 define external edges 502 as well as internal edges 504, which represent an internal opening of the island. In this example, lines 506 extending between radii of the circles 501 also define the overall shape of the respective island. In some examples, the circles 501 are each represented by three floating points: (center_x, center_y, radius).

FIG. 6 illustrates another example descriptor 600 that may be implemented in examples disclosed herein to score and/or define a geometric primitive (e.g., the geometric primitive 406). According to the illustrated example, portions (e.g., island portions, islands, etc.) 602, 604, 606, 608 are used to represent island shapes of a slice. The portions 602, 604, 606, 608 are represented by inscribed circles 610, 612, 616, 618, respectively, that are fit therein. In some examples, the inscribed circles 610, 612, 616, 618 are used to define occupied vs. empty ratios. In some examples, the portions 602, 604, 606, 608 are positioned based on a respective ratio representing filled over empty area. Additionally or alternatively, the inscribed circles 610, 612, 616, 618 are positioned based on distances to surrounding polygons or islands.

FIG. 7 illustrates yet another example descriptor 700 that may be implemented in examples disclosed herein to define and/or score a geometric primitive, such as the geometric primitive 406 of FIG. 4. The example descriptor 700 represents an island 701 of a batch. In FIG. 7, the descriptor 700 is a 2-D shape that also is represented as multiple overlapping circles 702. In this example, the overlapping circles 702 have corresponding positions and radii that define the overall shape (e.g., in a non-polygonal form) of the descriptor 700. In other examples, non-overlapping circles (or other shapes) are utilized. In some examples, the descriptor 700 is also characterized as a size distribution of radii corresponding to the circles 702, as shown in an example bar chart 704.

Returning to FIG. 3, The example batch analysis system 300 also includes the example risk calculator 306 to calculate a risk value associated with the slices. In addition, the example risk calculator 306 calculates an aggregate risk (e.g., an aggregate risk value) corresponding to the respective batches. For example, each of the plurality of batches are assigned an aggregate risk value based on respective slice risk values. In some examples, risk values associated with the slices are at least partially based on adjacent and/or neighboring slices of the batch. The risk calculator 306 of the illustrated example applies one or more rules (e.g., calculation rules and/or scoring) to calculate the risk values associated with the slices. Such rules can include rules related to reducing re-reflection, rules related to thermal heat transfer (e.g., cooling, thermal distribution, etc.) of the parts 204 during solidification, part density, part manufacturability and/or part homogeneity.

Figure 8:
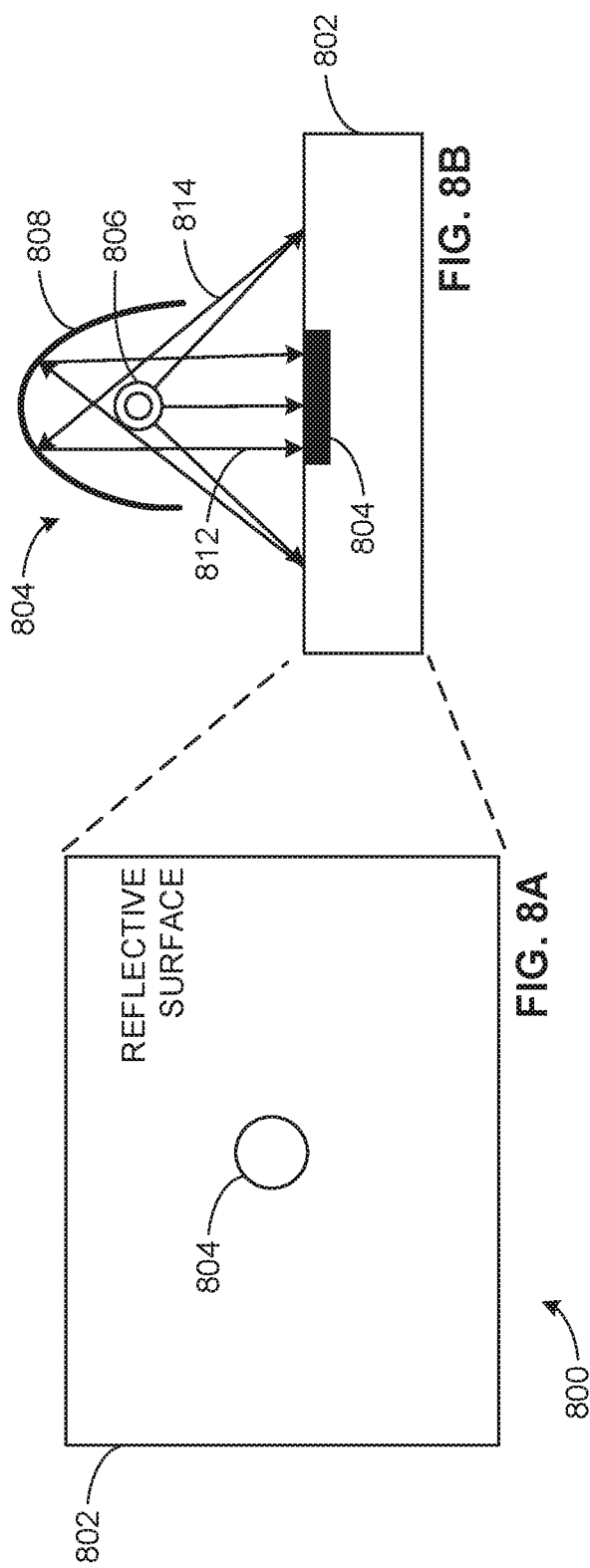
FIGS. 8A and 8B illustrate an example application of an example risk calculator of the batch analysis system of FIG. 3.

FIGS. 8A and 8B illustrate an example application of the risk calculator 306. Turning to FIG. 8A, a top view 800 of a build level of a corresponding build volume is shown. As shown in FIG. 8A, a build area 802 has a reflective surface, which can affect absorbed energy in a target area 804. The intended build portion is to be applied with energy to facilitate solidification during printing.

FIG. 8B is a cross-sectional view of the target area 804. In the illustrated example, an energy source (e.g., a laser, a heat source, etc.) 806 is shown with a corresponding hood or cover 808. As shown in FIG. 8B, rays 812 are directed to the target area 804 while rays 814 are also reflected back towards the hood 808 and, in turn, towards the target area 804. In particular, this re-reflection of the rays 814 causes additional unintended energy to be absorbed by the target area 804, thereby potentially adversely affecting part printing. In some examples, re-reflection can cause an increase in energy absorption of approximately 35%, for example. Thus, re-reflection can greatly impact relative small parts that are sparsely packed.

Accordingly, examples disclosed can be used to reduce this re-reflection or for other considerations (part density, part cooling, etc.). An example algorithm and/or rule utilized by the risk calculator 306 for assessing risk values related to re-reflection is shown below:
risk_score=0
Loop over all slices, for each slice:

collect its descriptor—a list of (x_c, y_c, R)
loop over all (x_c, y_c, R):
  if R is less than a pre-determined threshold: #a small island is identified
    compute its vicinity BLACK area ratio
    if BLACK area ratio is lower than a pre-determined threshold:
      # an island risk of re-radiation is identified risk_score increment by 1

The example application of FIGS. 8A and 8B is only one example of an assessment performed by the risk calculator 306. Other applications or design considerations can be accounted for using different risk evaluators and/or rules. In other examples, abrupt layer-to-layer changes and/or large island concentrations are reduced or minimized. In some examples, multiple risk evaluators are used in a risk assessment of slices and/or batches. For example, multiple considerations can be taken into account together in assessing risk of slices and/or corresponding batches (e.g., risk values are evaluated based on reducing re-reflection and avoiding relatively high part densities in regions, etc.).

In some examples, experimental-driven machine learning is employed by the risk calculator 306. In particular, part measurements of printed parts are taken into account. In some such examples, slices are used as an independent training input and encoded based on a descriptor (e.g., shapes that define portions of the respective slices) and/or compressed into statistical metrics extracted from the descriptor. The parts 204 are measured (e.g., dimensionally measured, surface parameters are measured, etc.) after being printed and can be labeled (e.g., significant re-reflection or negligible re-reflection) or assigned a value (e.g., a floating point value) to describe their respective levels (e.g., re-reflection levels). The labels for the slices can be denoted as x_c, y_c, good/bad, for example. The interactions between portions of parts captured in each slice (e.g., islands) are captured. An example risk analysis algorithm is shown below:
  risk_score=0
  A new batch is first sliced.
  Loop over all slices. For each slice:
  descriptor generation algorithm is applied.
  the trained model is then applied to the descriptor and obtain a list of (x_c, y_c, good/bad).
  risk_score is incremented by number of bad scores obtained.

Returning to FIG. 3, the batch selector 309 of the illustrated example selects at least one batch of the plurality of batches based on the respective aggregate risk values. For example, the batch selector 309 selects a batch with the lowest aggregate risk value to be produced in the volume 209 by the printer 120. In some examples, the batch selector 309 selects at least one batch of the plurality of batches to be further adjusted or modified during an evolution process. In such examples, relative positioning and/or orientations of the parts 204 can be adjusted within the volume 209 amongst batches selected to have the lowest aggregate risk values.

In some examples, the batch evolver 308 is used to adjust or vary batches based on the aggregate risk values. In particular, the batch evolver 308 can utilize a re-iterative process in conjunction with the risk calculator 306 to define modifications of at least one batch of the first plurality of batches based on aggregate risk scores. For example, the batch evolver 308 can select multiple batches having the lowest aggregate risk scores from a first batch and generate a second plurality of batches based on those selected batches (e.g., evolve or vary the selected batches) of the first plurality of batches. In turn, the updated corresponding risk aggregate risk values of the second plurality of batches are calculated by the risk calculator 306. This process can be repeated to evolve or adjust (e.g., continuously, periodically, aperiodically, and/or repeatedly adjust) the batches until at least one batch meets a criteria (e.g., exceeds or meets a threshold criteria or does not exceed nor meet the threshold criteria). For example, the criteria can be based on a comparison of the aggregate risk value to a threshold aggregate risk value and a batch is selected for printing when its aggregate risk value is below the threshold. In other examples, the batches are evolved until an aggregate risk value converges between evolution iterations (e.g., the lowest encountered aggregate risk value does not significantly change between iterations).

The part data storage 312 of the illustrated example stores data pertaining to batches and discretized slices. For example, the part data storage 312 may store a plurality of batches associated with an iteration of a batch evolution process. Additionally or alternatively, the part data storage 312 can store risk values associated with slices and/or aggregate risk values associated with batches. In other examples, the part data storage 312 stores geometric data (e.g., geometric representations of the batches, etc.). Any suitable data and/or processing history can be stored in the part data storage 312.

While an example manner of implementing the example batch analysis system 300 of FIG. 3 is illustrated in FIG. 3, one or more of the elements, processes, and/or devices illustrated in FIG. 3 may be combined, divided, re-arranged, omitted, eliminated, and/or implemented in any other way. Further, the example batch generator 302, the example discretizer 304, the example risk calculator 306, the example batch evolver 308, the example batch selector 309, the example part processor 310, the example part data storage 312, and/or, more generally, the example batch analysis system 300 of FIG. 3 may be implemented by hardware, software, firmware, and/or any combination of hardware, software, and/or firmware. Thus, for example, any of the example batch generator 302, the example discretizer 304, the example risk calculator 306, the example batch evolver 308, the example batch selector 309, the example part processor 310, the example part data storage 312, and/or, more generally, the example batch analysis system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example batch generator 302, the example discretizer 304, the example risk calculator 306, the example batch evolver 308, the example batch selector 309, the example part processor 310, and/or the example part data storage 312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example batch analysis system 300 of FIG. 3 may include one or more elements, processes, and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
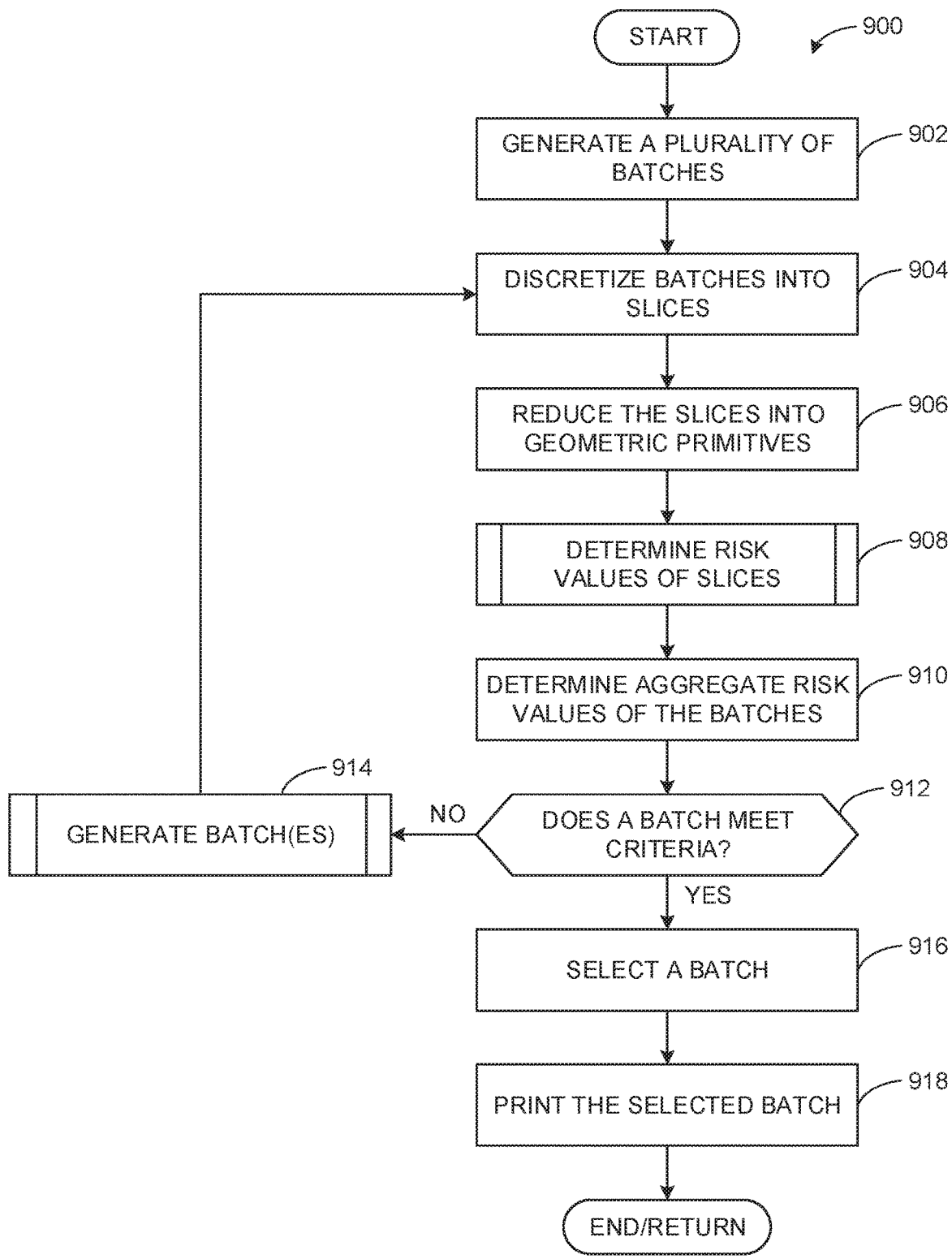
FIGS. 9-11 are flowcharts representative of machine readable instructions which may be executed to implement the batch analysis system of FIG. 3.
Figure 10:
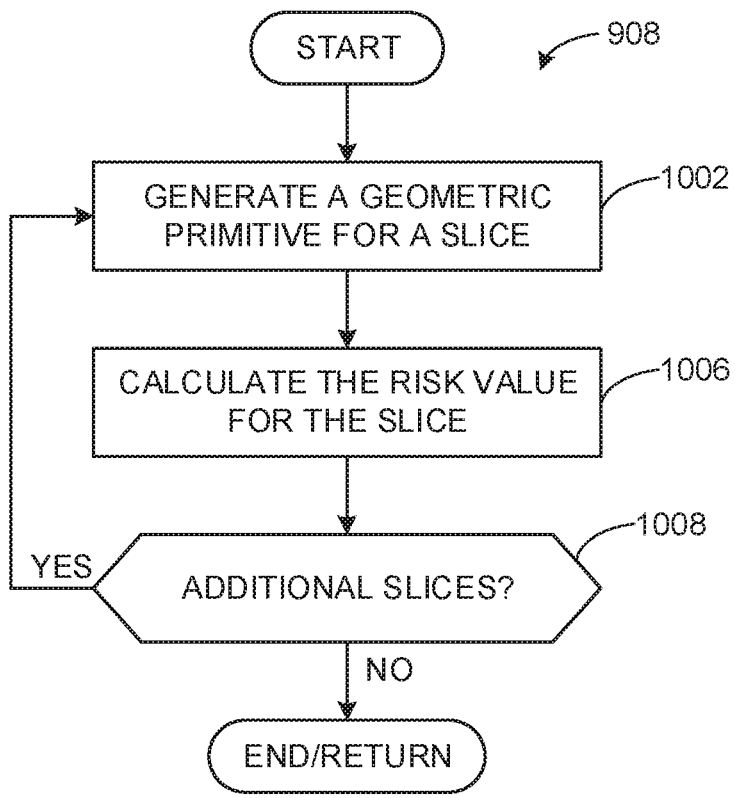
Figure 11:
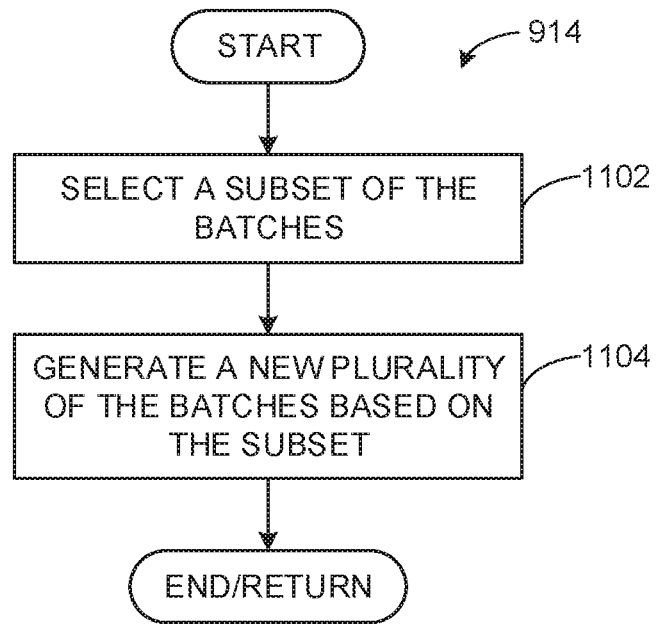

Flowcharts representative of example hardware logic or machine readable instructions for implementing the batch analysis system 300 of FIG. 3 are shown in FIGS. 9-11. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 4-6, many other methods of implementing the example batch analysis system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program 900 of FIG. 9 begins as the parts 204 are to be built in the volume 209. In this example, some of the parts 204 are different from others of the parts 204. In this example, the workstation 126 of FIG. 1 is being utilized to determine a batch arrangement of the parts 204 for manufacturability using the printer 120.

According to the illustrated example, the batch generator 302 generates a plurality of batches (block 902). In this example, the batch generator 302 generates the plurality of batches based on part data (e.g., a part request and/or part geometry data) received from the part processor 310. In some examples in which reiteration is utilized to modify batches and/or sets of batches, the batch generator 302 defines an initial set (e.g., a randomized set of batch arrangements) of batches based on the part data.

According to the illustrated example, the example discretizer 304 discretizes the batches into respective slices (block 904). In this example, the discretizer 304 generates uniformly spaced slices of the volume 209. However, in other examples, the spacing and/or slice thicknesses may vary along a span or length of the volume 209.

The example discretizer 304 also reduces the slices of the batches into geometric primitives (block 906). In some examples, the discretizer 304 converts each of the slices into Voronoi representations (e.g., Voronoi cells, etc.).

The risk calculator 306 of the illustrated example determines risk values corresponding to the slices generate by the discretizer 304 (block 908).

In this example, the risk calculator 306 calculates aggregate risk values of the batches based on the risk values of the corresponding slices (block 910). In some examples, the risk calculator 306 ranks the batches based on their respective aggregate risk values.

According to the illustrated example, the batch generator 302 and/or the risk calculator 306 determine whether a batch of the plurality of batches meets a criteria (block 912). This determination may be based on whether at least one batch of the plurality of batches has a corresponding aggregate risk value that meets a threshold such as, for example, a corresponding aggregate risk value being below a defined threshold risk value. In other examples, other criteria may be used. If the batch meets the criteria (block 912), control of the process proceeds to block 916. Otherwise, control of the process proceeds to block 914.

If at least one batch does not meet the criteria (block 912), a new plurality of batches is generated (block 914). In some examples, the new plurality of batches is generated by removing batches above an aggregate risk value threshold and modifying the remaining batches to generate additional batches. Additionally or alternatively, an evolution process is applied to the batches, as disclosed herein. In other examples, at least some batches of the new plurality of batches are randomly generated (e.g., the components 204 are randomly moved and/or re-oriented relative to one another). Once the new plurality of batches is generated, control of the process 900 returns to block 904.

In this example, if at least one batch does meet the criteria (block 912), the batch selector 309 selects a batch of the plurality of batches (block 916). In some examples, the batch selector 309 selects the batch based on the overall aggregate risk values (e.g., the lowest aggregate risk value amongst multiple aggregate risk values that meet the criteria).

After the batch is selected, the batch generator 302 directs the printer 120 to print the selected batch (block 918) and the process 900 ends.

Turning to FIG. 10, a flowchart representing the example subroutine 908 of FIG. 9 is shown. In this example, generated slices of the batch are analyzed for corresponding risk values.

According to the illustrated example, a geometric primitive and/or a descriptor of a slice is generated by the discretizer 304 (block 1002). In particular, the cross-sectional slice is represented in a simplified geometric form and/or construction that can be efficiently computed by a processor during an analysis of the slice. In this example, the slice is converted into a Voronoi cell.

The risk calculator 306 of the illustrated example calculates a risk value for the slice based on an application of a rule (block 1006). In this example, the rule is applied to the geometric primitive by the risk calculator 306 to calculate the associated risk value. In particular, rules associated with reducing re-reflection associated with the batch are applied to the geometric primitive in this example. Additionally or alternatively, rules associated with other factors, such as part density and/or cooling, are applied to calculate the risk value.

Next, it is determined whether additional slices are to be analyzed for risk values (block 1008). For example, if the risk calculator 306 and/or the discretizer 304 determine that additional slices are to be analyzed, control of the process 908 returns to block 1002. Otherwise, the process 908 ends/returns.

FIG. 11 is a flowchart representative of an example implementation of the example subroutine 914 of FIG. 9. This example implementation illustrated in FIG. 11 illustrates an example evolution process that may be implemented in examples disclosed herein.

In this example, a subset of the plurality of the batches is selected by the batch selector 309 (block 1102). For example, the batch selector 309 selects batches with corresponding aggregate risk values below a threshold to define the subset.

In some examples, the batch evolver 308 generates a new plurality of batches based on the subset (block 1104) and the process 414 ends/returns. For example, batches associated with the selected subset are modified to define a new plurality of batches, which are then processed and analyzed in accordance with the program 900 of FIG. 9.

While an example evolution process is described in conjunction with FIG. 11, any appropriate evolution or machine learning process may be implemented to progressively modify or evolve the plurality of batches (e.g., during a re-iterative process, in which the program 900 repeatedly finds that a batch does not meet criteria (block 1112) and repeatedly generates new batches (block 914 and FIG. 11).

Figure 12:
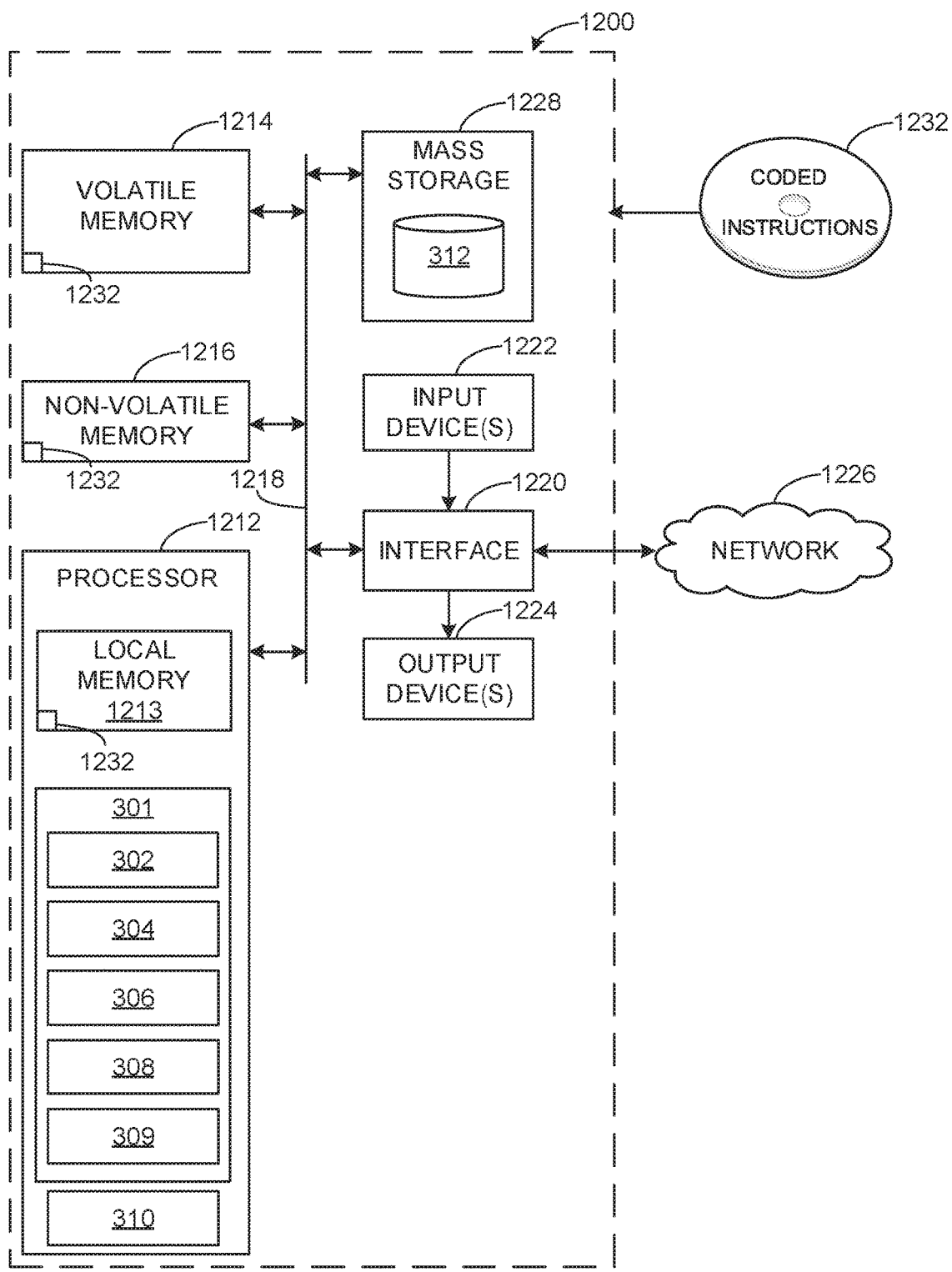
FIG. 12 is a block diagram of an example processing platform structured to execute the instructions of FIGS. 9, 10 and/or 11 to implement the example analysis system 300 of FIG. 3.

FIG. 12 is a block diagram of an example processor platform 1200 structured to execute the instructions of FIGS. 9-11 to implement the batch analysis system 300 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example batch generator 302, the example risk calculator 306, the example batch evolver 308, the example batch selector 309, and the example part processor 310.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 4-6 may be stored in the mass storage device 1228, in the volatile memory 1214, in the non-volatile memory 1216, and/or on a removable non-transitory computer readable storage medium such as a CD or DVD.

From the foregoing, it will be appreciated that example methods and apparatus have been disclosed that enable computationally efficient characterization of 3-D printing batches. The examples disclosed herein can be implemented to improve part manufacturability and part quality by facilitating selection and/or modification of part batches. Additionally or alternatively, examples disclosed herein can reduce re-reflection often associated with some 3-D printing processes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a processor to:
generate a plurality of batches, wherein each of the batches represent an arrangement of a plurality of parts to be printed in a volume,
discretize the batches into slices,
reduce the slices into geometric primitives,
determine risk values of the slices based on the respective geometric primitives,
determine aggregate risk values corresponding to the batches based on the risk values of the slices of the respective batches, and
select a batch of the plurality of batches based on the aggregate risk values; and
a printer to print the selected batch in the volume.

2. The apparatus as defined in claim 1, wherein the processor is to further compare at least one of the aggregate risk values to a threshold and generate a new batch when the at least one of the aggregate risk values exceeds the threshold.

3. The apparatus as defined in claim 1, wherein the processor is to further compare at least one of the aggregate risk values to a threshold and modify a batch of the plurality of batches when the at least one of the aggregate risk values exceeds the threshold.

4. The apparatus as defined in claim 1, wherein the processor is to determine the risk values of the slices based on reducing re-reflection.

5. The apparatus as defined in claim 1, wherein the processor is to determine the risk values of the slices based on a thermal distribution of the parts.

6. The apparatus as defined in claim 1, wherein the geometric primitives include Voronoi representations.

7. The apparatus as defined in claim 1, wherein the processor is to determine the risk values of the slices based on a material gradient.

8. A method comprising:
generating, by executing instructions with a processor, a plurality of batches, wherein each of the batches represents an arrangement of a plurality of parts to be printed in a volume;
discretizing, by executing instructions with a processor, the batches into slices;
reducing, by executing instructions with a processor, the slices into geometric primitives;
determining, by executing instructions with a processor, risk values of the slices based on the respective geometric primitives; and
determining, by executing instructions with a processor, aggregate risk values corresponding to the batches based on the risk values of the slices of the respective batches.

9. The method as defined in claim 8, further including:
selecting, by executing instructions with a processor, a batch of the plurality of batches based on the aggregate risk values; and
producing, by executing instructions with a processor, the parts in the volume based on the selected batch.

10. The method as defined in claim 9, wherein selecting the batch includes ranking batches of the plurality of batches based on the respective aggregate risk values.

11. The method as defined in claim 8, further including:
comparing, by executing instructions with a processor, at least one of the aggregate risk values to a threshold;
selecting a subset of the plurality of the batches based on the comparison of the at least one risk value to the threshold; and
generating, by executing instructions with a processor, a second plurality of batches based on the subset.

12. The method as defined in claim 8, wherein determining the risk value of the slices is based on reducing re-reflection.

13. The method as defined in claim 8, wherein determining the risk value of the slices is based on a thermal distribution of the parts.

14. A tangible machine readable medium comprising instructions, which when executed, cause a processor to at least:
discretize a plurality of batches into slices, wherein each of the batches represents an arrangement of a plurality of parts to be printed in a volume;
reduce the slices into geometric primitives;
determine risk values of the slices based on the respective geometric primitives;
determine aggregate risk values corresponding to the batches based on the risk values of the slices of the respective batches; and
select a batch of the plurality of batches based on the aggregate risk values.

15. The tangible machine readable medium as defined in claim 14, wherein the instructions cause the processor to cause a printer to produce the parts in the volume based on the selected batch.

16. The tangible machine readable medium as defined in claim 14, wherein the instructions cause the processor to:
compare at least one of the aggregate risk values to a threshold; and
generate a second plurality of batches based on the comparison of the at least one aggregate risk value to the threshold.

17. The tangible machine readable medium as defined in claim 14, wherein the instructions cause the processor to:
rank the batches based on the respective aggregate risk values;
select a subset of the batches based on the rank; and
modify batches of the subset to generate a second plurality of batches.

18. The tangible machine readable medium as defined in claim 17, further including eliminating batches not included in the subset.

19. The tangible machine readable medium as defined in claim 14, wherein the geometric primitives include Voronoi representations.

20. The tangible machine readable medium as defined in claim 14, the risk value of the slices is determined based on at least one of reducing re-reflection, a thermal distribution of the parts, or a material gradient.

* * * * *